Jan. 20, 1970  H. J. ROSENBERG  3,490,303
DRIVESHAFT PHASE ADJUSTING HUB
Filed March 26, 1968
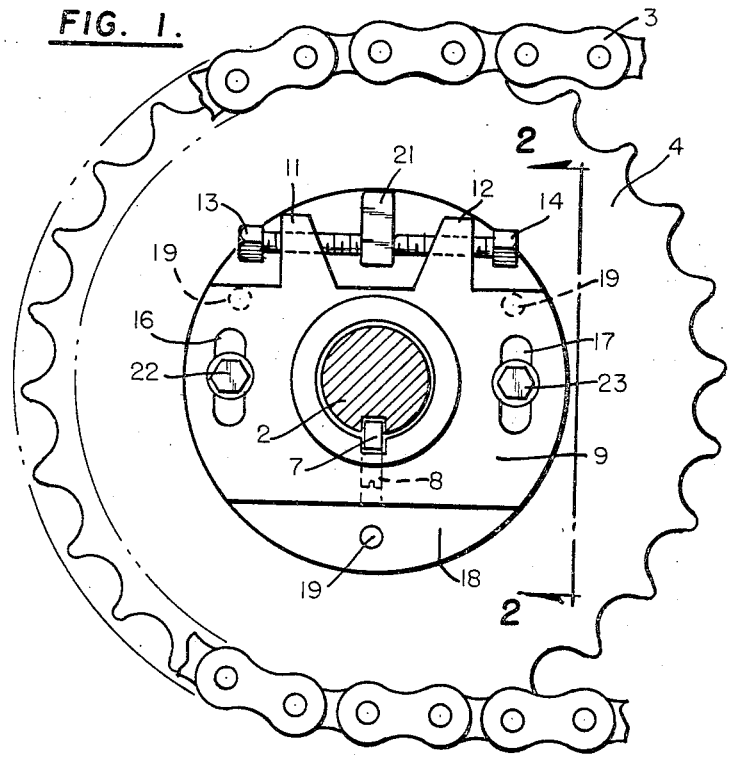
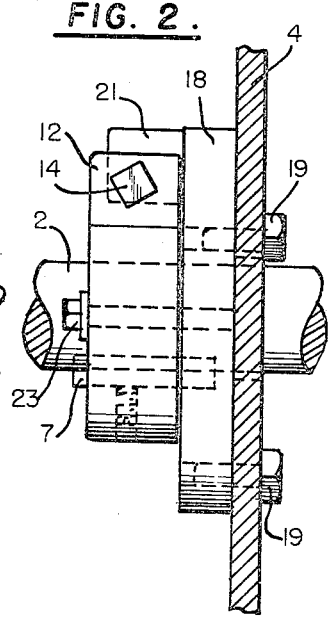
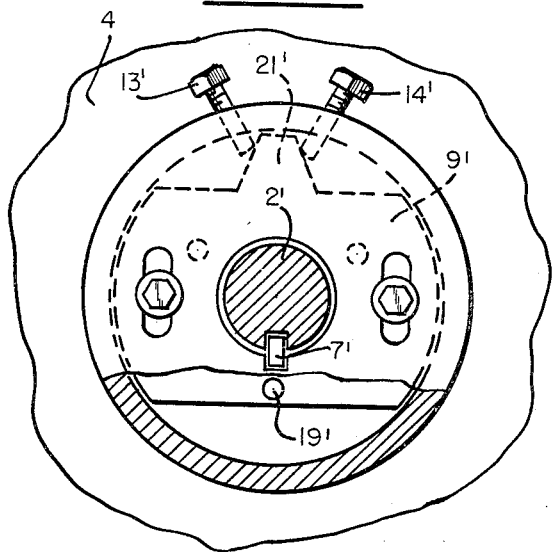
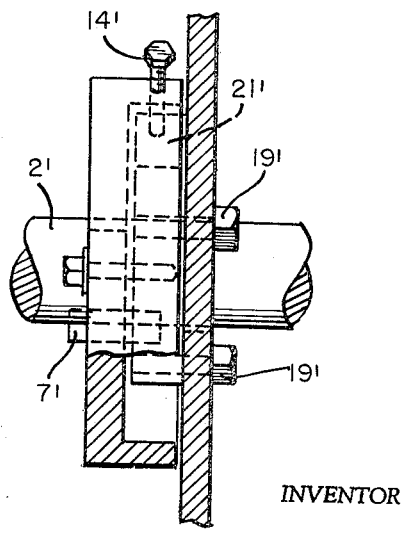
INVENTOR
Harold J. Rosenberg
BY *Max L. Libman*
ATTORNEY

United States Patent Office 3,490,303
Patented Jan. 20, 1970

3,490,303
DRIVESHAFT PHASE ADJUSTING HUB
Harold J. Rosenberg, 1408 Patuxent Drive,
Ashton, Md. 20702
Filed Mar. 26, 1968, Ser. No. 716,217
Int. Cl. F16h 55/30
U.S. Cl. 74—243          1 Claim

ABSTRACT OF THE DISCLOSURE

A mechanism for adjusting the physical phase relation between a driveshaft and a driven device such as a sprocket wheel or gear train, including a drive plate fixed to the shaft and a driven element fixed to the sprocket wheel, an adjustable screw means providing for a limited angular adjustment between the plate and element together with means for firmly clamping the plate and element together in their angularly adjusted position.

---

In the common situation wher a rotary element is driven from a driveshaft through a fixed gear train, a sprocket wheel, or any similar arrangement which maintains a fixed angular phase relationship between the driveshaft and the driven element, it is often important that a predetermined phase relationship be maintained between the driveshaft and the driven element. This is usually accomplished by loosening some part of the driving train, making the necessary adjustment by hand, by rotating the elements relative to each other until the desired phase relationship is obtained, then tightening down the loosened elements by means of screws, etc. This is both time-consuming and often unsatisfactory, because of the possibility of slippage and also because it is often difficult to manually adjust the elements to the exact phase relationship required. Furthermore, when normal wear requires a readjustment to be made, the entire procedure must be gone through again. The present invention provides a simple means for conveniently and rapidly making a highly accurate phase change between the driveshaft and the driven element, in a manner which precludes any possibility of slipping, and which permits a further readjustment to rapidly and conveniently whenever this becomes necessary. This is accomplished according to the present invention by providing a screw adjustment means between a portion of the driving and the driven elements, whereby an accurate and a positive angular phase setting may be accomplished, together with the provision of additional clamping means which tend to relieve the screw adjusting means of the main burden of transmitting force between the elements, whereby the possibility of wear and consequent mis-adjustment is minimized.

Other objects and advantages of my invention will become apparent as the following description proceeds, which description should be considered together with the accompanying drawings, in which:

FIG. 1 is a side view of a device according to the invention;

FIG. 2 is a view taken at right-angles to FIG. 1;

FIG. 3 is a side view of a modified form of the invention; and

FIG. 4 is a view taken at right-angles to FIG. 3.

Referring to FIGURES 1 and 2, the invention is exemplified for use with a sprocket drive, wherein a driveshaft 2 drives a sprocket chain 3 through the intermediary of a sprocket wheel 4. The sprocket shaft chain may drive any type of mechanism, and is widely used where, as necessary to maintain a predetermined angular relationship between the driven element and the driveshaft 2. Conversely, the shaft 2 may be the driven element and may be driven through sprocket chain 3 from any suitable rotary or motor device. Alternatively, instead of a sprocket drive, the connection between the shaft and the driven device may be a gear train, or any other known type of drive mechanism which tends to maintain a fixed phase relationship between the driving and driven elements.

Keyed to the driveshaft 2 by means of a key 7 which may be secured if desired by a screw 8 is a drive hub 9 having two upstanding ears or lugs 11 and 12 threaded to receive screws 13 and 14 respectively. Two large slots are provided in hub 9 as indicated at 16 and 17 respectively. A driven hub 18 is fastened to the sprocket wheel 4 in any suitable manner as by screws 19, and is provided with an ear 21 which extends into the space between lugs 11 and 12. Hub 9 is also provided with a longitudinal flanged bolt 22 which fits into a central hole in hub 18, to maintain the two hubs in concentric relationship. Threaded bolts 22 and 23 extend loosely in slots 16 and 17 into correspondingly threaded holes in driven hub 18, the slots being considerably wider than the diameter of the screw thread to permit angular adjustment between hubs 9 and 18.

The angular adjustment between hubs 9 and 18 is effected by first loosening the bolts 22 and 23, then adjusting screws 13 and 14 so as to position ear 21 in the desired relationship. In this manner, a limited angular adjustment of the two hubs is made possible. It will be understood that the apparatus has been initially adjusted to approximately the desired phase relationship, and the present invention is intended only to provide for small and minor adjustments, since major adjustments can be made by disengaging the sprocket (or gear teeth), then rotating the elements relative to each other until the desired relationship is obtained. However, this permits an adjustment only to the nearest sprocket or gear tooth, and in many practical instances this is too coarse an adjustment to suit the purpose. In practice, an arrangement providing for an angular adjustment in the order of 20–25 degrees is sufficient for all practical purposes. This can be very accurately done by retreating one of the screws 13, 14, and advancing the other until the ear 21 has been moved sufficiently to accomplish the desired adjustment. After this has been done, the bolts 22 and 23 are tightened. This minimizes the tendency for screws 13 and 14 to become loosened in use.

Preferably, the two hub elements 9 and 18 are dynamically balanced so that they may be used with fairly high-speed machinery, and it will be noted that displacement of screws 13, 14 has only a very slight affect in altering the dynamic balance of the system. However, at higher speeds, where even this small amount of unbalance may be a factor, an arrangement such as shown in FIGURES 3 and 4 may be used. This is essentially similar to the arrangement of FIGS. 1 and 2, and corresponding parts are marked with the same reference numeral, with a prime ('). However, in this case the screws 13', 14' are moved radially to make the necessary adjustment, and it will be noted that as one of the screws is moved in toward the center of the device, the other screw is moved a similar distance away from the device, thus tending to maintain the dynamic balance. Furthermore, tap holes for the screws may be provided at suitably spaced intervals completely around the perimeter of the hub 9', so that the angular adjustment may be made at any angular position, and is not limited to a relatively small range as in FIG. 1.

I claim:

1. (a) mechanism for adjusting the physical angular phase relationship between a driveshaft and a driven device including,
   (b) a drive hub element and means for fixing said hub element to said shaft for rotation therewith, (c) a rotatable driven hub element concentric with said driveshaft, and means for rotatably driving said driven device from said driven hub element, (d) adjustable screw means between said drive hub element and said driven hub element for adjusting the angular relationship between said elements, (e) clamping means for firmly clamping the said drive hub element and said driven hub element together in their angularly adjusted position, (f) said clamping means comprising clamping screw means, one of said driven and drive elements having a slot therein, said clamping screw means passing loosely through said slot into the other of said elements to clamp both said elements together in various angular positions, (g) said driven hub element having an outwardly projecting lug with two sloping sides, (h) said adjustable screw means comprising two separately adjustable screw elements engaging respectively said sloping sides in such manner that as one screw element is loosened and the other tightened, the ends of the screw elements engage different points on said sloping sides to adjust said angular relationship, (i) the axes of said screw elements being substantially radial with respect to said center of rotation so that the loosened screw moves away from said center and the tightened screw moves toward the center to maintain the assembly in balance.

References Cited

UNITED STATES PATENTS 1,691,408 11/1928 Palmer.
3,369,436 2/1968 Loase _____ 74—395 XR FRED C. MATTERN, JR., Primary Examiner J. A. WONG, Assistant Examiner U.S. Cl. X.R.

74—395